(12) United States Patent
Santos et al.

(10) Patent No.: US 9,882,407 B2
(45) Date of Patent: Jan. 30, 2018

(54) BATTERY DETECTION VIA VOLTAGE REGULATION OF BATTERY TERMINALS

(71) Applicant: Apple Inc., Cupertino, CA (US)

(72) Inventors: Jose V. Santos, Cupertino, CA (US); Yongxuan Hu, Cupertino, CA (US); Steve Sterz, Cupertino, CA (US); Rob Hoyt, Cupertino, CA (US); Soundararajan Manthiri, Cupertino, CA (US)

(73) Assignee: Apple Inc., Cupertino, CA (US)

(*) Notice: Subject to any disclaimer, the term of this patent is extended or adjusted under 35 U.S.C. 154(b) by 117 days.

(21) Appl. No.: 14/845,846

(22) Filed: Sep. 4, 2015

(65) Prior Publication Data
US 2016/0072314 A1 Mar. 10, 2016

Related U.S. Application Data

(60) Provisional application No. 62/046,825, filed on Sep. 5, 2014.

(51) Int. Cl.
*H02J 7/00* (2006.01)
*H02J 7/04* (2006.01)

(52) U.S. Cl.
CPC ............ *H02J 7/007* (2013.01); *H02J 7/0036* (2013.01); *H02J 7/0006* (2013.01); *H02J 7/0021* (2013.01); *H02J 7/0026* (2013.01); *H02J 7/0031* (2013.01); *H02J 7/0047* (2013.01); *H02J 7/0068* (2013.01); *H02J 7/045* (2013.01); *H02J 2007/0001* (2013.01)

(58) Field of Classification Search
CPC ...... H02J 7/0021; H02J 7/0068; H02J 7/0026; H02J 7/0031; H02J 7/0047; H02J 2007/0037; H02J 2007/0001; H02J 2007/004; H02J 2007/005; H02J 7/0006; H02J 7/0011; H02J 7/007; H02J 7/045
See application file for complete search history.

(56) References Cited

U.S. PATENT DOCUMENTS

| | | | | |
|---|---|---|---|---|
| 4,659,977 | A * | 4/1987 | Kissel | H02J 7/16 320/150 |
| 4,737,702 | A * | 4/1988 | Koenck | H02J 9/061 320/114 |
| 5,489,836 | A * | 2/1996 | Yuen | H02J 1/10 320/148 |
| 7,795,843 | B2 * | 9/2010 | Keates | G01R 31/025 320/134 |
| 7,843,167 | B2 * | 11/2010 | DeRome | H02J 7/0045 320/107 |
| 8,026,695 | B2 * | 9/2011 | De Koning | H02J 7/0031 320/134 |
| 8,310,103 | B2 * | 11/2012 | Fischer | H02J 7/0019 307/66 |

(Continued)

*Primary Examiner* — Helen Rossoshek
(74) *Attorney, Agent, or Firm* — Blank Rome LLP

(57) ABSTRACT

The disclosed embodiments provide a system that manages use of a battery in a portable electronic device. During operation, the system attempts to regulate a voltage on a battery terminal in the portable electronic device to a first voltage level. Upon identifying an inability to regulate the voltage on the battery terminal to the first voltage level during a first detection period, the system detects a presence of the battery in the portable electronic device.

17 Claims, 5 Drawing Sheets

(56) References Cited

U.S. PATENT DOCUMENTS

| | | | | |
|---|---|---|---|---|
| 8,513,922 B2* | 8/2013 | Yang | ............... | H02J 7/0026 |
| | | | | 320/116 |
| 8,638,210 B2* | 1/2014 | Simon | ............... | G08B 25/10 |
| | | | | 340/506 |
| 9,136,509 B2* | 9/2015 | Tam | ............... | H01M 2/0212 |
| 9,450,401 B2* | 9/2016 | Li | ............... | H02H 9/026 |
| 2007/0182366 A1* | 8/2007 | Lee | ............... | G01R 31/3648 |
| | | | | 320/107 |
| 2012/0139498 A1* | 6/2012 | Chang | ............... | G01R 19/14 |
| | | | | 320/134 |
| 2012/0229091 A1* | 9/2012 | Kanzaki | ............... | G01R 31/362 |
| | | | | 320/112 |
| 2013/0162201 A1* | 6/2013 | Yeh | ............... | H02J 7/025 |
| | | | | 320/108 |
| 2016/0093921 A1* | 3/2016 | Kadirvel | ............... | H01M 10/48 |
| | | | | 320/112 |

* cited by examiner

BATTERY DETECTION VIA VOLTAGE REGULATION OF BATTERY TERMINALS

BACKGROUND

Field

The disclosed embodiments relate to battery chargers for portable electronic devices. More specifically, the disclosed embodiments relate to techniques for performing battery detection via voltage regulation of battery terminals in portable electronic devices.

Related Art

Portable electronic devices, such as laptop computers, portable media players, and/or mobile phones, typically operate using a rechargeable battery. Furthermore, designs for such batteries often include battery packs that contain battery cells connected together in various series and parallel configurations. For example, a six-cell battery pack of lithium-polymer cells may be configured in a three in series, two in parallel (3s2p) configuration. Hence, if a single cell can provide a maximum of 3 amps with a voltage ranging from 2.7 volts to 4.2 volts, then the entire battery pack can have a voltage range of 8.1 volts to 12.6 volts and provide 6 amps of current.

A battery in a portable electronic device is typically managed by a circuit, which is commonly known as a battery management unit (BMU). The BMU may be integrated into the battery pack of the portable electronic device and perform functions such as gauging the battery's capacity and/or providing electrical protection for the battery. For example, the BMU may open a protection circuit that disconnects the battery from the portable electronic device upon detecting a fully depleted battery and/or an overvoltage situation that may damage the battery.

By opening the protection circuit, the BMU may interfere with detection of the battery from the portable electronic device. For example, a charger in the portable electronic device may be unable to differentiate between a missing battery and a battery with an open protection circuit, which has the same voltage as the missing battery when measured from the portable electronic device. The charger may further be unable to determine if the battery is connected to or disconnected from the portable electronic device. As a result, the charger may attempt to charge a non-existent battery and/or a battery with an open protection circuit, which may result in a system voltage collapse and/or a system reset in the portable electronic device.

Consequently, use of batteries with portable electronic devices may be facilitated by mechanisms for detecting the presence of the batteries in the portable electronic devices, even if the protection circuits of the batteries are open.

SUMMARY

The disclosed embodiments provide a system that manages use of a battery in a portable electronic device. During operation, the system attempts to regulate a voltage on a battery terminal in the portable electronic device to a first voltage level. Upon identifying an inability to regulate the voltage on the battery terminal to the first voltage level during a first detection period, the system detects a presence of the battery in the portable electronic device.

In some embodiments, the system attempts to regulate the voltage on the battery terminal to a second voltage level upon identifying an ability to regulate the voltage on the battery terminal to the first voltage level during the first detection period. Next, the system detects the presence of the battery in the portable electronic device upon identifying an inability to regulate the voltage on the battery terminal to the second voltage level during a second detection period following the first detection period.

In some embodiments, the first and second voltage levels include a low voltage level and a high voltage level.

In some embodiments, the low voltage level and the high voltage level are higher than a minimum voltage requirement of a battery-management unit (BMU) in the battery.

In some embodiments, upon identifying an ability to regulate the voltage on the battery terminal to the second voltage level during the second detection period, the system attempts to regulate the voltage on the battery terminal to the first voltage level during a third detection period following the second detection period. Next, upon identifying the ability to regulate the voltage on the battery terminal to the first voltage level during the third detection period, the system attempts to regulate the voltage on the battery terminal to the second voltage level during a fourth detection period following the third detection period.

In some embodiments, the system enables charging of the battery from the charging circuit after the presence of the battery in the portable electronic device is detected.

In some embodiments, attempting to regulate the voltage on the battery terminal to the first voltage level includes attempting to regulate the voltage on the battery terminal to within a regulation window around the first voltage level.

In some embodiments, identifying the inability to regulate the voltage on the battery terminal to the first voltage level includes identifying the voltage on the battery terminal as lower or higher than the first voltage level outside of the regulation window.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a charging circuit, a dedicated or shared processor that executes a particular software module or a piece of code at a particular time, and/or other programmable-logic devices now known or later developed. When the hardware modules or apparatus are activated, they perform the methods and processes included within them.

Figure 1:
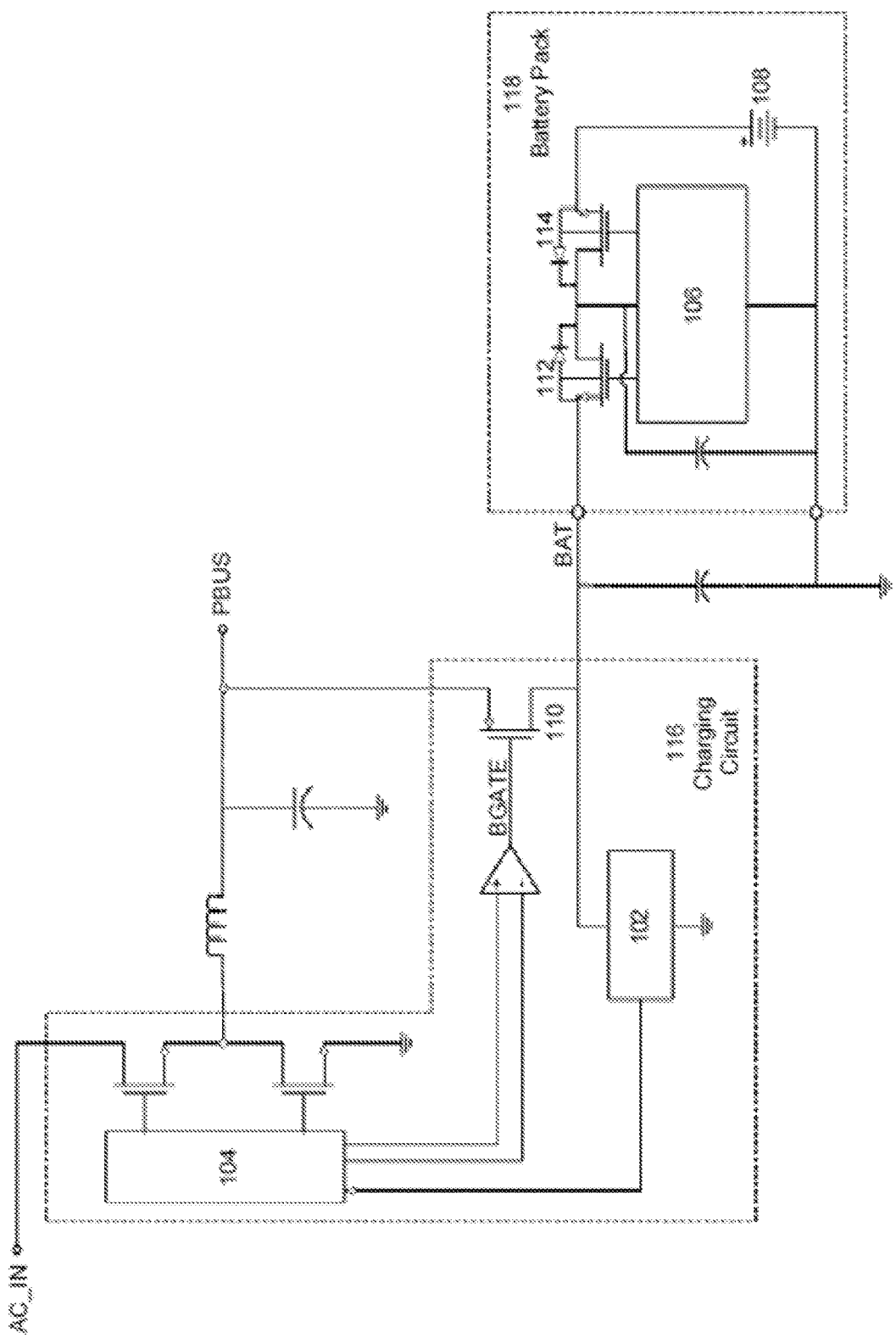
FIG. 1 shows a system for managing use of a battery in a portable electronic device in accordance with the disclosed embodiments.

The disclosed embodiments provide a method and system for managing use of a battery in a portable electronic device. As shown in FIG. 1, a battery 108 may be included in a battery pack 118 that is installed in the portable electronic device (e.g., during assembly of the portable electronic device). Battery 108 may include one or more cells in a parallel and/or series configuration and supply power to a laptop computer, tablet computer, portable media player, mobile phone, digital camera, peripheral device, handheld device, and/or other battery-powered electronic device. For example, battery 108 may be a lithium-polymer battery that includes one or more cells, each of which includes a jelly roll of layers wound together (e.g., a cathode with an active coating, a separator, and an anode with an active coating) and a flexible pouch enclosing the jelly roll. Alternatively, battery 108 may be a nickel-cadmium (Ni—Cd) battery, nickel-metal-hydride (Ni-MH) battery, lithium-ion battery, and/or other type of rechargeable battery.

Battery pack 118 may also include a battery-management unit (BMU) 106 that is used to gauge the capacity of battery 108, electrically protect battery 108, and/or otherwise manage the operation and use of battery 108. For example, BMU 106 may open a protection circuit containing a discharge field-effect transistor (FET) 112 and/or a charge FET 114 to disconnect battery 108 from the portable electronic device upon detecting a fully depleted battery 108 and/or an overvoltage and/or overcurrent condition.

Battery 108 may be connected to the portable electronic device through a battery terminal (e.g., "BAT"). A charging circuit 116 may enable charging of battery 108 through the battery terminal when an input voltage (e.g., "AC_IN") is available and discharging of battery 108 through the battery terminal when the input voltage is not available. For example, a controller 104 in charging circuit 116 may use a power converter to convert the input voltage from an external source into low-voltage direct current (DC) that can be used to charge battery 108 through the battery terminal and/or operate components (e.g., processor, memory, radio, display, input/output (I/O) devices, etc.) of the portable electronic device through a system terminal (e.g., "PBUS"). When power from an external power outlet is not available, controller 104 may allow the components to be powered by battery 108 until battery 108 is fully depleted and BMU 106 opens the protection circuit.

The operation of charging circuit 116 may further depend on the presence or absence of battery 108 in the portable electronic device. Battery 108 may be present in the portable electronic device (e.g., coupled to the battery terminal) after the portable electronic device is assembled and/or during normal use of battery 108 with the portable electronic device. While battery 108 is present, charging circuit 116 may enable charging or discharging of battery 108 by turning on a battery FET 110. On the other hand, battery 108 may be absent from the portable electronic device prior to installation and/or during replacement of battery 108 in the portable electronic device. If battery 108 is absent, charging circuit 116 may turn battery FET 110 off to prevent the flow of current to or from the battery terminal.

If charging circuit 116 is unable to detect the presence or absence of battery 108, the operation of the portable electronic device may be adversely affected. For example, charging circuit 116 may charge battery 108 by alternating between constant-voltage charging, in which the charge voltage of battery 108 is held constant, and constant-current charging, in which the charge current of battery 108 is held constant. If charging circuit 116 attempts to charge in constant-current mode while battery 108 is missing and/or otherwise disconnected from the battery terminal (e.g., while the protection circuit is open), charging circuit 116 may not supply enough power to recover from a dip on the system terminal, and the portable electronic device may experience a system collapse and/or reset.

However, the use of conventional battery-detection techniques to detect battery 108 may be associated with a number of drawbacks. For example, charging circuit 116 may use a conventional battery-detection technique that sources and sinks current from the battery terminal to detect battery 108; if the battery terminal cannot be slewed above and below a threshold, battery 108 may be detected as present. However, such a battery-detection technique may require an additional "battery-present" pin to detect battery 108 and cycle a deeply discharged battery 108 above and below the acceptable operating limits of BMU 106. As a result, BMU 106 may be reset a number of times, which may increment a reset counter in BMU 106 that is used for reliability measurements.

In another example, charging circuit 116 may use a different conventional battery-detection technique that senses current flow into battery 108 while regulating the system terminal (e.g., "PBUS") to two different voltages with battery FET 110 on. If current flows into battery 108, battery 108 may be detected as present. On the other hand, current delivered to battery 108 may not be easily regulated, and charging circuit 116 may need to provide power to the portable electronic device through the system terminal. Because battery FET 110 is on with no charge-current regulation, high amounts of current may potentially flow into battery 108. Moreover, toggling between different voltages on the system terminal may cause issues with the operation of components in the portable electronic device, which are powered from the system terminal.

Charging circuit 116 may additionally be unable to detect an installed battery 108 with an open protection circuit. For example, charging circuit 116 may be unable to detect battery 108 through a voltage and/or current measurement if the protection circuit in battery 108 is open, which effectively disconnects the battery from the battery terminal.

In one or more embodiments, charging circuit 116 includes functionality to detect battery 108 without requiring additional pins and/or interfering with the operation of the portable electronic device. More specifically, charging circuit 116 includes a detection circuit 102 that attempts to regulate the voltage on the battery terminal (e.g., "BAT") to one of two voltage levels. If the voltage on the battery terminal cannot be regulated to either of the voltage levels (e.g., because battery 108 has a voltage that is different from one or both voltage levels), detection circuit 102 may detect battery 108 as present in the portable electronic device. Detection circuit 102 is described in further detail below with respect to FIG. 2.

Such detection of battery 108 may be performed during power-up of the portable electronic device. For example, charging circuit 116 may initiate detection of battery 108 after a sufficient input voltage to the portable electronic device is detected. Before battery 108 is detected, charging circuit 116 may disable battery FET 110 to prevent charging of a missing and/or disconnected battery 108. To detect battery 108, detection circuit 102 may attempt to regulate the voltage on the battery terminal to a first voltage level that is higher than a voltage requirement of BMU 106, thereby allowing BMU 106 to operate. If the voltage cannot be regulated to within a regulation window around (e.g., within 5% of) the first voltage level during a pre-specified detection period (e.g., a number of milliseconds), detection circuit 102 may determine that battery 108 is present, and charging circuit 116 may turn battery FET 110 on to enable charging of battery 108.

If the voltage can be regulated to within the regulation window of the first voltage level during the detection period, detection circuit 102 may attempt to regulate the voltage to a second voltage level that is higher than the voltage requirement of BMU 106 and different from (e.g., higher or lower than) the first voltage level. If the voltage cannot be regulated to within a regulation window around the second voltage level during a subsequent detection period, detection circuit 102 may detect the presence of battery 108, and charging circuit may proceed with charging of battery 108. The second voltage level may thus be used to detect battery 108 when the voltage of battery 108 lies within the regulation window of the first voltage level.

If the voltage can be regulated to within the regulation window of the second voltage level, detection circuit 102 may continue the battery-detection process by alternating between attempts to regulate the voltage to the first and second voltage levels in subsequent detection periods. During detection of battery 108, controller 104 may use the input voltage to power components of the portable electronic device without turning on battery FET 110 and charging battery 108, and detection circuit 102 may supply a voltage that is high enough to power BMU 106. The supplied voltage may allow BMU 106 to close the protection circuit on battery 108 to connect battery 108 to the battery terminal. Once the protection circuit is closed, detection circuit 102 may detect battery 108, and controller 104 may enable charging of battery 108 by turning battery FET 110 on. Consequently, the system of FIG. 1 may enable accurate detection of battery 108 without adversely affecting the operation of the portable electronic device, BMU 106, and/or battery 108, even if the protection circuit of battery 108 is open.

Figure 2:
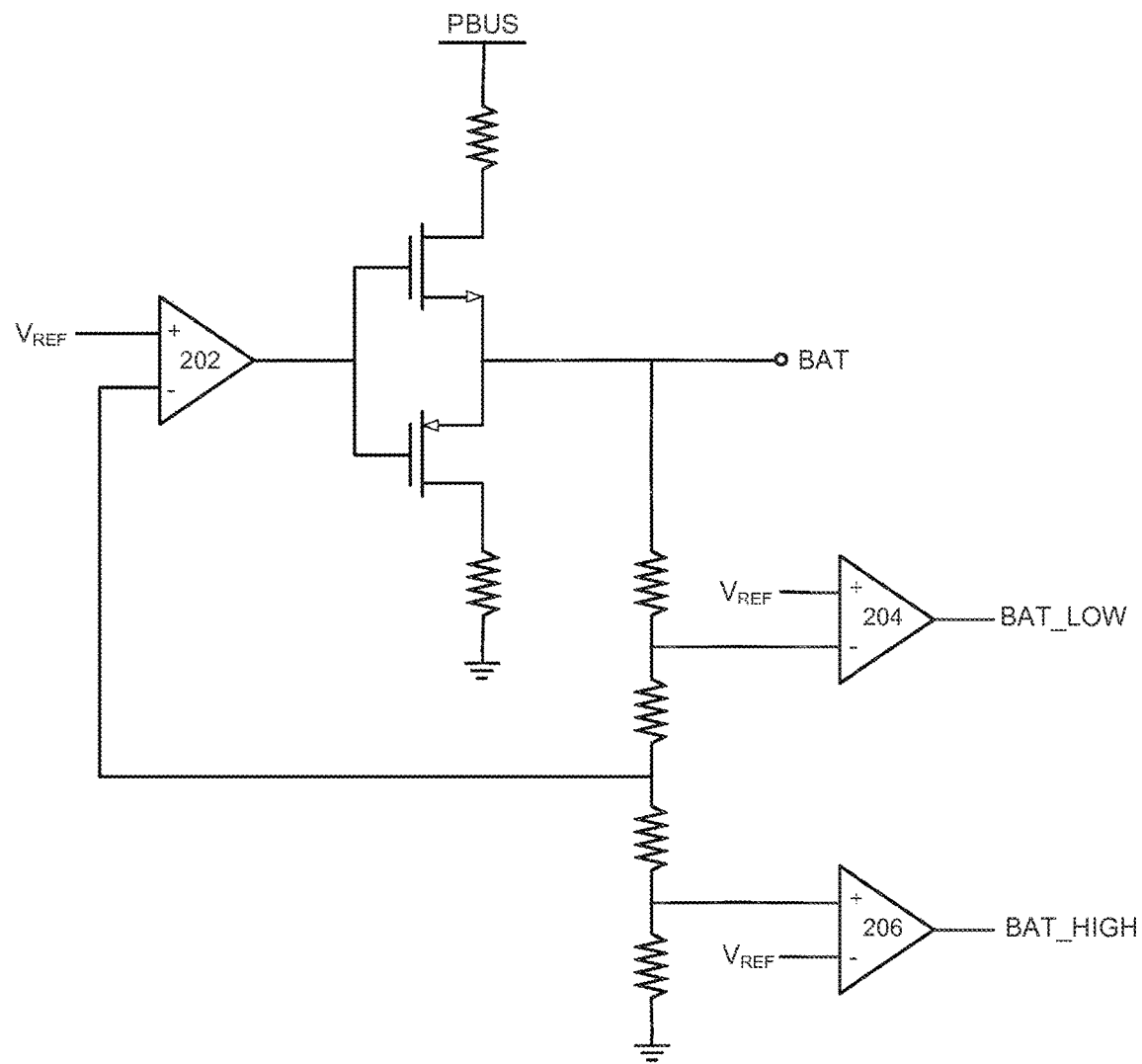
FIG. 2 shows an example detection circuit in accordance with the disclosed embodiments.

FIG. 2 shows a detection circuit (e.g., detection circuit 102 of FIG. 1) in accordance with the disclosed embodiments. The detection circuit may include a current-limited amplifier 202 that uses a reference voltage (e.g., "$V_{REF}$") to regulate the battery terminal (e.g., "BAT") of a portable electronic device. For example, amplifier 202 may be a class-A amplifier, class-B amplifier, class-AB amplifier, and/or another regulator that can sink or source current.

As mentioned above, the reference voltage may be one of two voltage levels, such as a low voltage level and a high voltage level. For example, the reference voltage may be generated by a voltage-generation mechanism in the detection circuit and/or a charging circuit containing the detection circuit. The reference voltage may be generated separately from a system voltage used to power components in the portable electronic device. Both voltage levels may be within the voltage operating limits of a BMU (e.g., BMU 106 of FIG. 1) for a battery (e.g., battery 108 of FIG. 1) in the portable electronic device. As a result, either voltage level may allow the BMU to operate, while the current from amplifier 202 may be too limited to charge the battery. Regulating voltages on battery terminals during detection of batteries in portable electronic devices is described in further detail below with respect to FIG. 3.

A set of comparators 204-206 may then be used to detect the battery based on the ability to regulate the voltage on the battery terminal to the reference voltage. Comparator 204 may compare the voltage on the battery terminal with the reference voltage and output a high "BAT_LOW" signal when the voltage on the battery terminal is lower than the reference voltage by more than a given margin (e.g., percentage and/or number of millivolts). Comparator 206 may compare the voltage on the battery terminal with the reference voltage and output a high "BAT_HIGH" signal when the voltage on the battery terminal is higher than the reference voltage by more than a given margin (e.g., percentage and/or number of millivolts). A high signal from either comparator 204-206 may represent the inability to regulate the voltage on the battery terminal to within a regulation window represented by the margins of comparators 204, thus indicating that the battery is present in the portable electronic device.

For example, the detection circuit may attempt to regulate the voltage on the battery terminal to one of two reference voltages that are 20% apart, and comparators 204-206 may output high signals if the voltage on the battery terminal is over 5% lower or higher than the reference voltages, respectively. If the battery's voltage is within 5% of one reference voltage, the battery's presence may be detected when the detection circuit attempts to regulate the voltage on the battery terminal to the other reference voltage.

Figure 3:
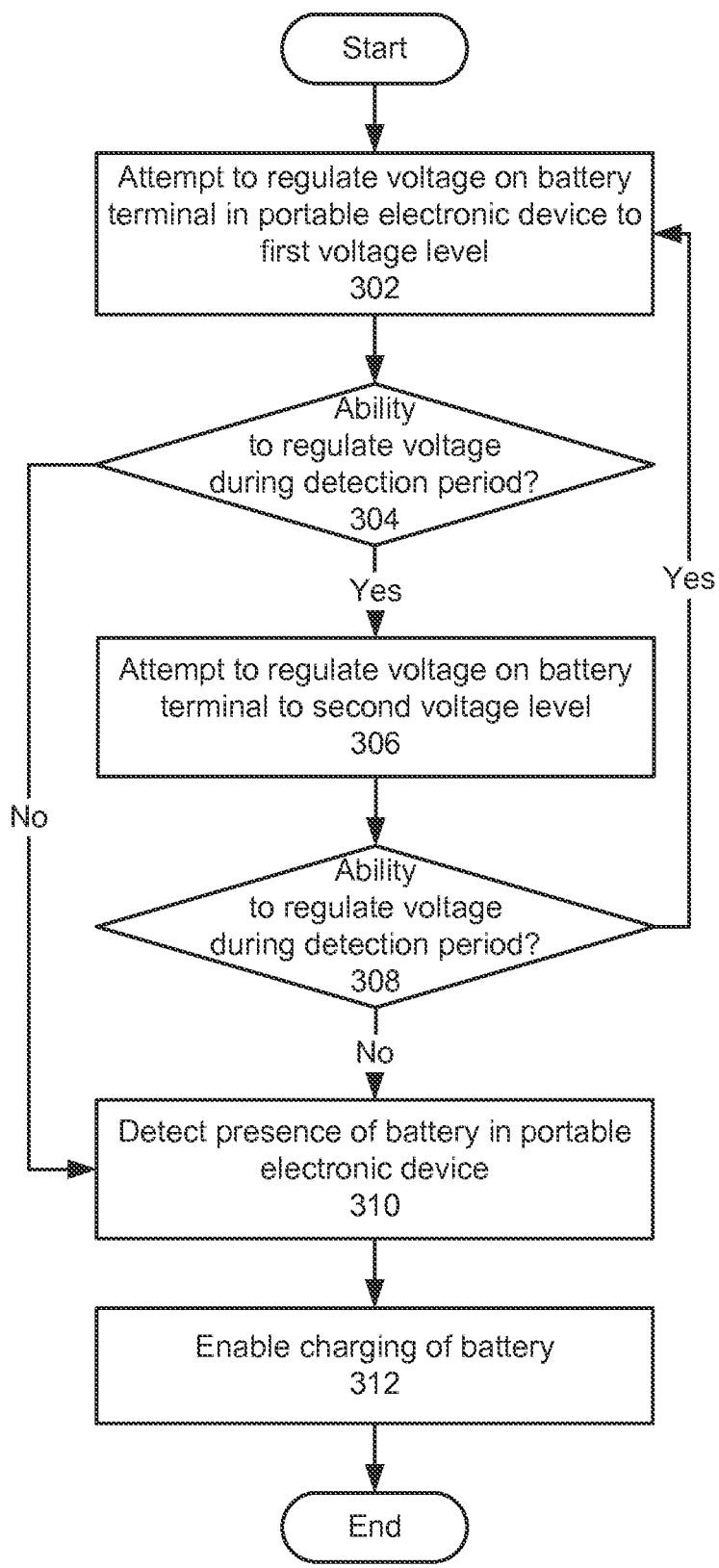
FIG. 3 shows a flowchart illustrating the process of managing use of a battery in a portable electronic device in accordance with the disclosed embodiments.

FIG. 3 shows a flowchart illustrating the process of managing use of a battery in a portable electronic device in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, detection of the battery in the portable electronic device may be performed. For example, battery detection may be performed during power-up of the portable electronic device, with charging of the battery disabled until the battery is detected. To detect the battery, an attempt to regulate the voltage on a battery terminal in the portable electronic device to a first voltage level (operation 302) is made. For example, a charging circuit in the portable electronic device (e.g., charging circuit 116 of FIG. 1) may include a voltage-generation mechanism that generates the first voltage level separately from the system voltage used to power components in the portable electronic device and a detection circuit that attempts to regulate the voltage on the battery terminal to within a regulation window (e.g., percentage or number of millivolts) around the first voltage level. The first voltage level may be higher than the voltage requirement of a BMU for a battery in the portable electronic device to enable operation of the BMU during detection of the battery.

The battery may be detected based on the ability to regulate the voltage to the first voltage level during a detection period (operation 304). For example, the ability to regulate the voltage may be identified if the voltage is within the regulation window around the first voltage level at the end of the detection period. Conversely, an inability to regulate the voltage to the first voltage level may be identified if the voltage on the battery terminal is lower or higher than the first voltage level outside of the regulation window during and/or at the end of the detection period. If the inability to regulate the voltage to the first voltage level during the detection period is identified, the presence of the battery in the portable electronic device is detected (operation 310), and charging of the battery is enabled (operation 312).

If the ability to regulate the voltage to the first voltage level during the detection period is identified, an attempt to regulate the voltage to a second voltage level (operation 306) is made. For example, the voltage-generation mechanism may generate the second voltage level, and the detection circuit may attempt to regulate the voltage on the battery terminal to within a regulation window around the second voltage level. The second voltage level may be higher or lower than the first voltage level by an amount that is greater than the regulation windows around both voltage levels, so that there is no overlap between the regulation windows around the voltage levels. The second voltage level may also be higher than the voltage requirement of the BMU to allow the BMU to operate during detection of the battery.

The battery may be detected based on the ability to regulate the voltage to the second voltage level during a detection period (operation 306) following the detection period in operation 304. For example, the ability to regulate the voltage to the second voltage level may be based on a regulation window around the second voltage level, with the ability to regulate the voltage identified if the voltage is within the regulation window around the second voltage level at the end of the detection period. On the other hand, the inability to regulate the voltage may be identified if the voltage is higher or lower than the second voltage level outside of the regulation window during and/or at the end of the detection period. If the inability to regulate the voltage to the second voltage level during the detection period is identified, the presence of the battery in the portable electronic device is detected (operation 310), and charging of the battery is enabled (operation 312).

If the ability to regulate the voltage to the second voltage level is identified, the presence of the battery may remain undetected. As a result, detection of the battery may continue by attempting to regulate the voltage to the first or second voltage levels in alternating detection periods and identifying the ability or inability to regulate the voltage at the end of each detection period (operations 302-308). For example, operations 302-308 may be repeated until the battery is installed in the portable electronic device and/or the BMU closes a protection circuit for the battery. Once the inability to regulate the voltage to one of the voltage levels is identified at the end of a detection period, the battery is detected as present (operation 310), and charging of the battery is enabled (operation 312).

Figure 4:
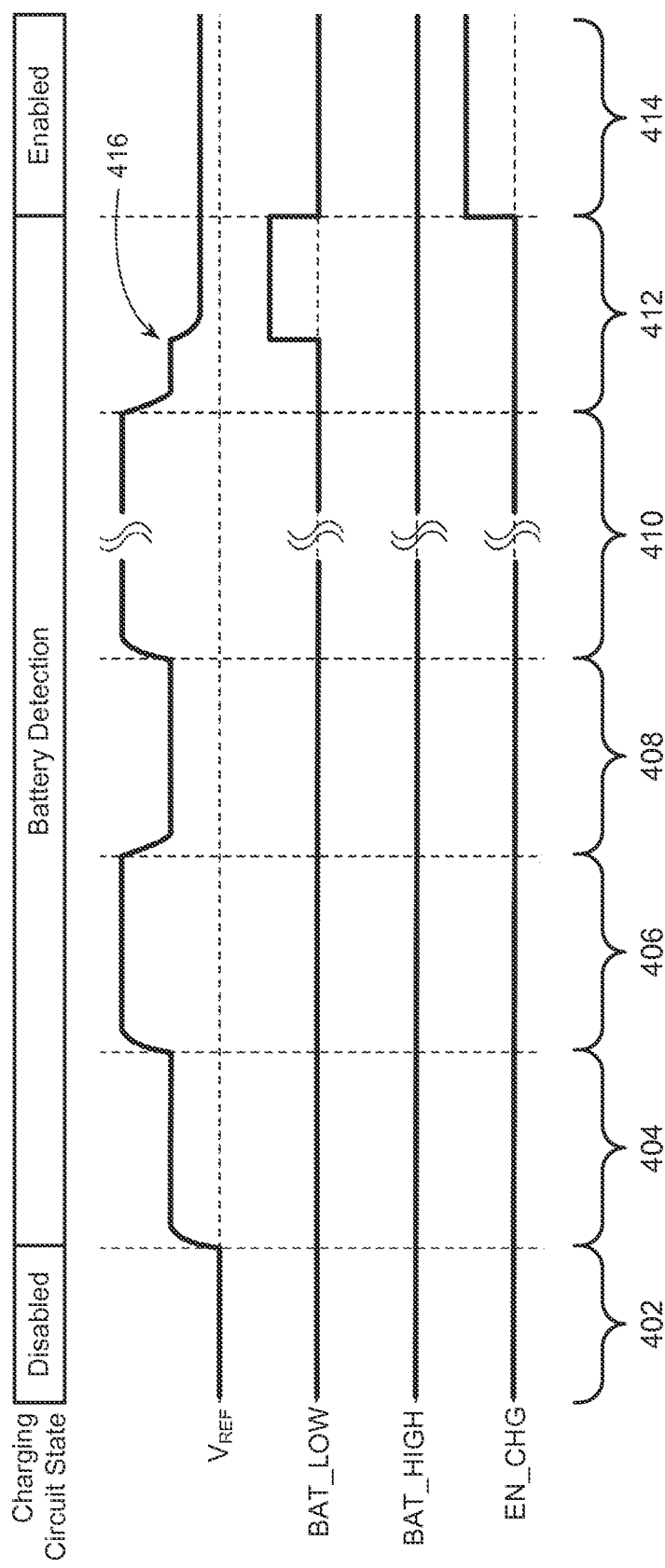
FIG. 4 shows an exemplary timeline of operations involved in detecting a battery in a portable electronic device in accordance with the disclosed embodiments.

FIG. 4 shows an exemplary timeline of operations involved in detecting a battery in a portable electronic device in accordance with the disclosed embodiments. More specifically, FIG. 4 shows a series of time intervals 402-414 associated with the detection of a fully depleted battery with an open protection circuit. During a first time interval 402, a charging signal (e.g., "EN_CHG") for enabling charging of the battery is low, and a charging circuit in the portable electronic device is disabled. A reference voltage (e.g., "$V_{REF}$") for regulating the voltage on a battery terminal in the portable electronic device is not generated, and the "BAT_LOW" and "BAT_HIGH" signals are low, indicating that no difference is detected between the reference voltage and the voltage on a battery terminal in the portable electronic device.

During a second time interval 404, the charging circuit may operate in battery-detection mode, and a voltage-generation mechanism in the charging circuit may increase the reference voltage to a first voltage level, which is applied to the battery terminal in an attempt to regulate the voltage on the battery terminal to the first voltage level. Time interval 404 may thus represent a first detection period, during which the first voltage level is supplied to a BMU of the battery to enable operation of the BMU. However, because the protection circuit of the battery is still open, the "BAT_LOW," "BAT_HIGH," and "EN_CHG" signals may remain low.

During a third time interval 406, the voltage-generation mechanism may change the reference voltage to a second voltage level that is higher than the first voltage level. Time interval 406 may thus represent a second detection period, in which the second voltage level continues to enable operation of the BMU while the protection circuit of the battery remains open. In turn, a fourth time interval 408 may represent a third detection period, in which the reference voltage is transitioned back to the first voltage level after the ability to regulate the voltage on the battery terminal to the second voltage level is found during time interval 406.

Cycling of the reference voltage between the two voltage levels may continue for a time interval 410 spanning a number of detection periods of the charging circuit. During time intervals 404-410, the protection circuit may be open, allowing the voltage on the battery terminal to be regulated to the reference voltage. Because the voltage can be regulated to the reference voltage, the "BAT_LOW," "BAT_HIGH," and "EN_CHG" signals may remain low to indicate regulation of the reference voltage to within the regulation windows of the first and second voltage levels and disabling of battery charging in the portable electronic device.

During time interval 412, the reference voltage may initially be at the first voltage level. However, the BMU may close the protection circuit at a point 416 within time interval 412, thus causing the voltage on the battery terminal to drop below the first voltage level. In turn, the "BAT_LOW" signal may transition from low to high to indicate the dropping of the voltage on the battery terminal to lower than the first voltage level outside of the regulation window of the first voltage level. The high "BAT_LOW" signal may continue to be generated until the end of the detection period represented by time interval 412, thus indicating the presence of the battery in the portable electronic device. After the detection period represented by time interval 412 has passed, a high "EN_CHG" signal may be generated in time interval 414, and the charging by charging circuit may be enabled.

Those skilled in the art will appreciate that the battery may be detected in earlier time intervals if the battery is installed in the portable electronic device and has a voltage that is higher than that of a fully depleted battery. For example, an undepleted battery with a voltage that is lower than the first reference voltage may be detected after a high "BAT_LOW" signal is generated during time interval 404. Conversely, a battery with a voltage that is higher than the first reference voltage may be detected after a high "BAT_HIGH" signal is generated during time interval 404. Finally, a battery with a voltage that is within the regulation window of the first voltage level may be detected after the reference voltage is increased to the second voltage level and a high "BAT_LOW" signal is generated during time interval 406.

Figure 5:
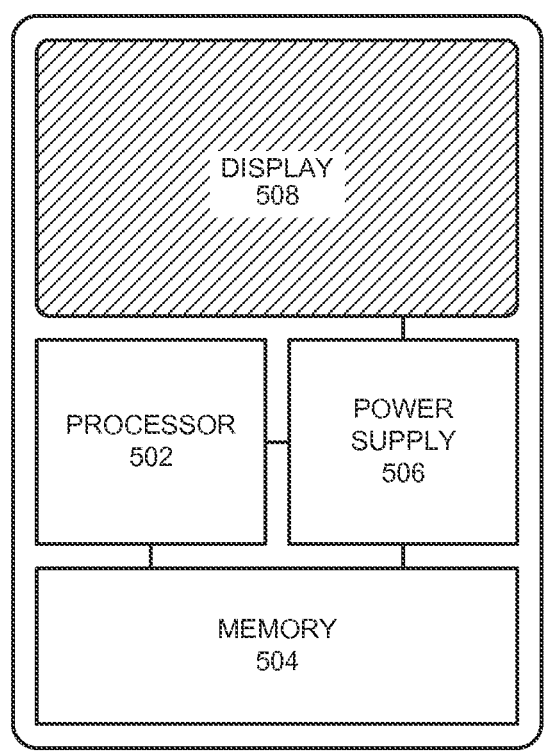
FIG. 5 shows a portable electronic device in accordance with the disclosed embodiments.

The above-described charging circuit can generally be used in any type of electronic device. For example, FIG. 5 illustrates a portable electronic device 500 which includes a processor 502, a memory 504 and a display 508, which are all powered by a power supply 506. Portable electronic device 500 may correspond to a laptop computer, tablet computer, mobile phone, portable media player, digital camera, and/or other type of battery-powered electronic device. Power supply 506 may include a charging circuit that attempts to regulate a voltage on a battery terminal in the portable electronic device to a first or second voltage level during alternating detection periods. Upon identifying an inability to regulate the voltage on the battery terminal to the first or second voltage levels during one of the detection periods, the charging circuit may detect a presence of the battery in the portable electronic device and enable charging of the battery.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for managing use of a battery in a portable electronic device, comprising:
   attempting to regulate, from a charging circuit, a voltage on a battery terminal in the portable electronic device to a first voltage level;
   upon identifying an inability to regulate the voltage on the battery terminal to the first voltage level during a first detection period, attempting to regulate the voltage on the battery terminal to a second voltage level; and
   upon identifying an inability to regulate the voltage on the battery terminal to the second voltage level during a second detection period following the first detection period, detecting the presence of the battery in the portable electronic device.

2. The method of claim 1, wherein the first and second voltage levels comprise a low voltage level and a high voltage level.

3. The method of claim 2, wherein the low voltage level and the high voltage level are higher than a minimum voltage requirement of a battery-management unit (BMU) in the battery.

4. The method of claim 1, further comprising:
   upon identifying an ability to regulate the voltage on the battery terminal to the second voltage level during the second detection period, attempting to regulate the voltage on the battery terminal to the first voltage level during a third detection period following the second detection period; and
   upon identifying the ability to regulate the voltage on the battery terminal to the first voltage level during the third detection period, attempting to regulate the voltage on the battery terminal to the second voltage level during a fourth detection period following the third detection period.

5. The method of claim 1, further comprising:
   enabling charging of the battery from the charging circuit after the presence of the battery in the portable electronic device is detected.

6. The method of claim 1, wherein attempting to regulate the voltage on the battery terminal to the first voltage level comprises:
   attempting to regulate the voltage on the battery terminal to within a regulation window around the first voltage level.

7. The method of claim 6, wherein identifying the inability to regulate the voltage on the battery terminal to the first voltage level comprises:
   identifying the voltage on the battery terminal as lower or higher than the first voltage level outside of the regulation window.

8. The method of claim 1, wherein the presence of the battery in the portable electronic device is detected during power-up of the portable electronic device.

9. A system for managing use of a battery in a portable electronic device, comprising:
   a voltage-generation mechanism configured to generate a first voltage level and a second voltage level separately from a system voltage used to power components in the portable electronic device; and
   a detection circuit configured to:
      attempt to regulate a voltage on a battery terminal in the portable electronic device to the first voltage level; and
      upon identifying an inability to regulate the voltage on the battery terminal to the first voltage level during a first detection period, attempt to regulate a voltage on a battery terminal in the portable electronic device to the second voltage level;
      upon identifying an inability to regulate the voltage on the battery terminal to the second voltage level during a second detection period following the first detection period, detect the presence of the battery in the portable electronic device.

10. The system of claim 9, wherein the first and second voltage levels comprise a low voltage level and a high voltage level.

11. The system of claim 9, wherein the detection circuit is further configured to:
    enable charging of the battery from a charging circuit after the presence of the battery in the portable electronic device is detected.

12. The system of claim 9, wherein attempting to regulate the voltage on the battery terminal to the first voltage level comprises:
    attempting to regulate the voltage on the battery terminal to within a regulation window around the first voltage level.

13. The system of claim 12, wherein identifying the inability to regulate the voltage on the battery terminal to the first voltage level comprises:

identifying the voltage on the battery terminal as lower or higher than the first voltage level outside of the regulation window.

14. A portable electronic device, comprising:
   a battery;
   a set of components powered by the battery; and
   a charging circuit configured to:
      attempt to regulate a voltage on a battery terminal in the portable electronic device to a first voltage level; and
      upon identifying an inability to regulate the voltage on the battery terminal to the first voltage level during a first detection period, attempt to regulate the voltage on the battery terminal to a second voltage level; and
      upon identifying an inability to regulate the voltage on the battery terminal to the second voltage level during a second detection period following the first detection period, detect the presence of the battery in the portable electronic device.

15. The portable electronic device of claim 14, wherein the first and second voltage levels comprise a low voltage level and a high voltage level.

16. The portable electronic device of claim 14, wherein the charging circuit is further configured to:
   enable charging of the battery from the charging circuit after the presence of the battery in the portable electronic device is detected.

17. The portable electronic device of claim 14, wherein the presence of the battery in the portable electronic device is detected during power-up of the portable electronic device.

* * * * *